(12) United States Patent
Aguilera et al.

(10) Patent No.: US 12,175,290 B2
(45) Date of Patent: Dec. 24, 2024

(54) OPTIMIZED MEMORY TIERING

(71) Applicant: VMware, Inc., Palo Alto, CA (US)

(72) Inventors: Marcos Kawazoe Aguilera, Mountain View, CA (US); Renu Raman, Palo Alto, CA (US); Pratap Subrahmanyam, Saratoga, CA (US); Praveen Vegulla, Cupertino, CA (US); Rajesh Venkatasubramanian, San Jose, CA (US)

(73) Assignee: VMware LLC, Palo Alto, CA (US)

( * ) Notice: Subject to any disclaimer, the term of this patent is extended or adjusted under 35 U.S.C. 154(b) by 634 days.

(21) Appl. No.: 17/382,848

(22) Filed: Jul. 22, 2021

(65) Prior Publication Data

US 2023/0031304 A1 Feb. 2, 2023

(51) Int. Cl.
*G06F 9/50* (2006.01)
*G06F 9/48* (2006.01)
*G06F 12/08* (2016.01)

(52) U.S. Cl.
CPC .......... *G06F 9/5016* (2013.01); *G06F 9/4856* (2013.01); *G06F 9/5027* (2013.01); *G06F 12/08* (2013.01); *G06F 2209/505* (2013.01); *G06F 2212/1044* (2013.01)

(58) Field of Classification Search
None
See application file for complete search history.

(56) References Cited

U.S. PATENT DOCUMENTS

| | | | | |
|---|---|---|---|---|
| 8,463,825 B1* | 6/2013 | Harty | G06F 16/188 | 711/100 |
| 8,918,613 B2* | 12/2014 | Kato | G06F 3/0649 | 711/158 |
| 9,893,953 B1* | 2/2018 | Castelli | G06F 3/0605 | |
| 10,176,212 B1* | 1/2019 | Prohofsky | G06F 16/2365 | |
| 10,353,610 B1* | 7/2019 | Khokhar | G06F 3/0605 | |
| 10,481,794 B1* | 11/2019 | Castelli | G06F 3/0653 | |
| 2004/0078541 A1* | 4/2004 | Lightstone | G06F 12/123 | 711/170 |
| 2007/0050548 A1* | 3/2007 | Bali | G06F 12/0804 | 711/E12.04 |
| 2007/0083712 A1* | 4/2007 | Bradford | G06F 12/0846 | 711/E12.045 |
| 2011/0252214 A1* | 10/2011 | Naganuma | G06F 3/0685 | 711/170 |
| 2011/0320754 A1* | 12/2011 | Ichikawa | G06F 3/0685 | 711/E12.002 |
| 2012/0011329 A1* | 1/2012 | Nonaka | G06F 3/0604 | 711/E12.001 |
| 2012/0102291 A1* | 4/2012 | Cherian | G06F 9/5044 | 711/170 |
| 2012/0203999 A1* | 8/2012 | Jess | G06F 3/0605 | 711/E12.002 |

(Continued)

*Primary Examiner* — Adam Lee
(74) *Attorney, Agent, or Firm* — King Intellectual Asset Management

(57) ABSTRACT

Disclosed are various embodiments for optimized memory tiering. An ideal tier size for a first memory and an ideal tier size for a second memory can be determined for a process. Then, a host computing device can be identified that can accommodate the ideal tier size for the first memory and the second memory. Subsequently, the process can be assigned to the host computing device.

20 Claims, 9 Drawing Sheets

(56) References Cited

U.S. PATENT DOCUMENTS

| | | | |
|---|---|---|---|
| 2012/0303929 A1* | 11/2012 | Chiu | G06F 16/13 |
| | | | 711/173 |
| 2012/0317355 A1* | 12/2012 | Ishizaki | G06F 3/0647 |
| | | | 711/E12.001 |
| 2012/0317373 A1* | 12/2012 | Ninose | G06F 3/0689 |
| | | | 711/E12.001 |
| 2013/0080727 A1* | 3/2013 | Naito | G06F 3/0676 |
| | | | 711/E12.002 |
| 2013/0198435 A1 | 8/2013 | Sandadi et al. | |
| 2013/0198449 A1* | 8/2013 | Belluomini | G06F 3/0604 |
| | | | 711/117 |
| 2013/0212349 A1* | 8/2013 | Maruyama | G06F 11/3452 |
| | | | 711/167 |
| 2013/0332614 A1* | 12/2013 | Brunk | G06F 3/0685 |
| | | | 709/226 |
| 2015/0301743 A1* | 10/2015 | Nagao | G06F 3/0689 |
| | | | 711/113 |
| 2016/0026501 A1* | 1/2016 | Polkovnikov | H04L 43/16 |
| | | | 709/215 |
| 2016/0048355 A1* | 2/2016 | Iliadis | G06F 3/0649 |
| | | | 711/171 |
| 2016/0117241 A1* | 4/2016 | Shah | G06F 12/0895 |
| | | | 711/119 |
| 2016/0179405 A1* | 6/2016 | Sabloniere | G06F 3/061 |
| | | | 711/114 |
| 2016/0202933 A1* | 7/2016 | Alatorre | G06F 3/0683 |
| | | | 711/154 |
| 2016/0253265 A1* | 9/2016 | Rapoport | G06F 3/0685 |
| | | | 711/135 |
| 2016/0283140 A1* | 9/2016 | Kaushik | G06F 3/061 |
| 2016/0378654 A1* | 12/2016 | Chambliss | G06F 3/0685 |
| | | | 711/122 |
| 2017/0024137 A1* | 1/2017 | Kanno | G06F 3/0679 |
| 2017/0060740 A1* | 3/2017 | Doerner | G06F 12/121 |
| 2017/0288705 A1* | 10/2017 | Li | H03M 13/2948 |
| 2018/0203614 A1* | 7/2018 | Aronovich | G06F 3/0683 |
| 2018/0210676 A1* | 7/2018 | Aronovich | G06F 3/0685 |
| 2018/0253384 A1* | 9/2018 | Li | G06F 12/0804 |
| 2018/0260323 A1* | 9/2018 | John | G06F 12/0864 |
| 2019/0042124 A1* | 2/2019 | Doshi | G06F 3/0653 |
| 2019/0138437 A1* | 5/2019 | Bennett | G06F 3/0611 |
| 2019/0146718 A1* | 5/2019 | Ben Dayan | G06F 3/0604 |
| | | | 711/154 |
| 2019/0155511 A1* | 5/2019 | Tenner | G06F 3/0608 |
| 2020/0042208 A1* | 2/2020 | Roberts | G06F 3/0605 |
| 2020/0073564 A1* | 3/2020 | Das | G06F 3/064 |
| 2020/0326871 A1* | 10/2020 | Wu | G06F 3/0647 |
| 2021/0263860 A1* | 8/2021 | Gupta | G06F 12/122 |
| 2022/0407931 A1* | 12/2022 | Gunda | H04L 41/5019 |

\* cited by examiner

OPTIMIZED MEMORY TIERING

BACKGROUND

Modern computer systems use virtual memory, in which the memory of the system is divided into logical pages, and page tables map the logical pages to physical pages. This map provides a feature known as address translation. Address translation is useful because it allows a process or virtual machine (VM) to use its own addresses irrespective of what pages are available to them.

However, some computer systems can offer multiple types of memory, which can be arranged into tiers based on the amount of memory available, the performance capabilities of the memory available, etc. The physical address space is partitioned by the tiers. For example, a Tier A for DRAM may consist of a range of physical pages from A0 until A1, while a Tier B for persistent memory may consist of a range of physical pages from B0 until B1. The operating system is aware of these ranges, so that it can pick physical pages to store data based on its desired choice of tier.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for allocating pages from different tiers of memory to a process. A process can be allocated pages from different memory tiers (e.g., a higher performance memory tier and a lower performance memory tier). Pages that are frequently accessed by the process can be mapped to the higher performance memory tier, while pages that are infrequently accessed by the process can be mapped to the lower performance memory tier. This allows for a process to avoid having pages swapped out to a swap device, while maintaining performance due to the mapping of frequently accessed pages to the higher performance memory tier.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Figure 1:
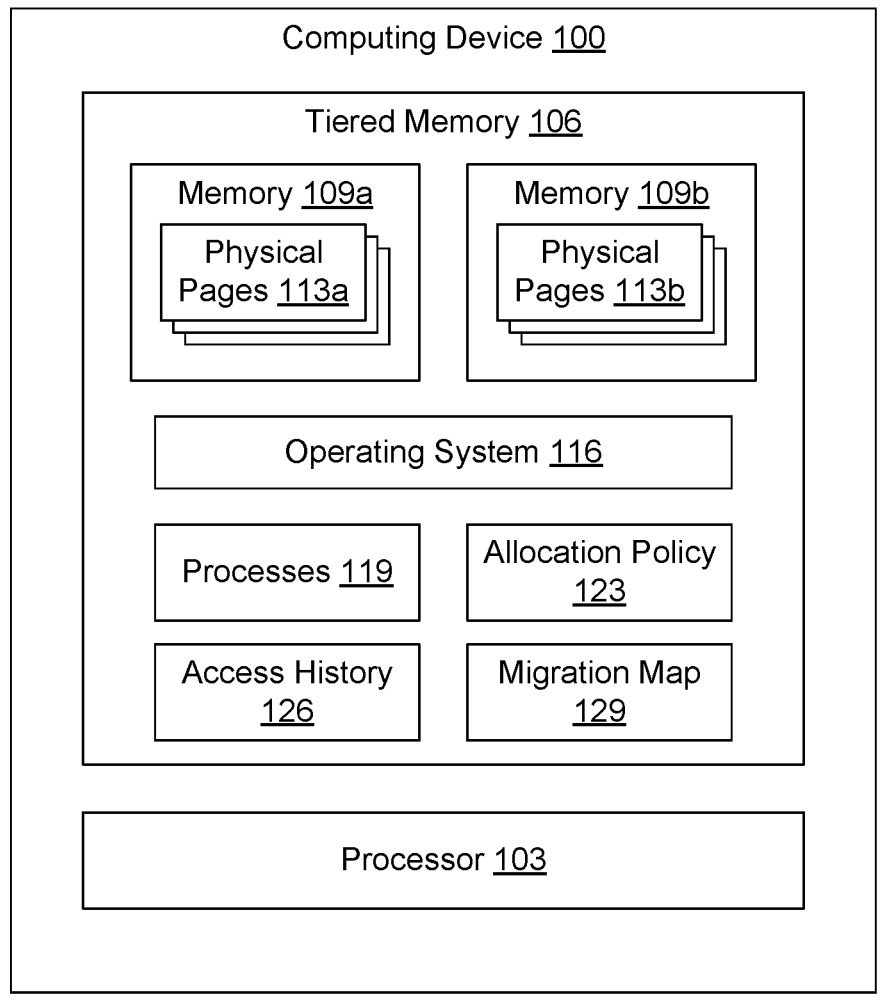
FIG. 1 is a drawing depicting one of several embodiments of the present disclosure.

FIG. 1 depicts a computing device 100 according to various embodiments of the present disclosure. The computing device 100 can include components such as one or more processors 103, tiered memory 106, and/or other components (e.g., a network interface). For example, the computing devices can be configured to perform computations on behalf of other computing devices or applications. As another example, such computing devices can host and/or provide content to other computing devices in response to requests for content.

The processor 103 can represent any circuit or combination of circuits that can execute one or more machine-readable instructions stored in the tiered memory 106 that make up a computer program or process and store the results of the execution of the machine-readable instructions in the tiered memory 106. In some implementations, the processor 103 may be configured to perform one or more machine-readable instructions in parallel or out of order. This could be done if the processor 103 includes multiple processor cores and/or additional circuitry that supports simultaneous multithreading (SMT). Examples of a processor 103 can include a central processing unit (CPU), a graphics processing unit (GPU), a field-programmable gate array (FPGA), application specific integrated circuits (ASICs), etc.

The tiered memory 106 can include a first memory 109a, a second memory 109b, and potentially additional memories 109 (collectively or generically referred to as memory 109). Each memory 109 can represent a different type of memory technology. For example, one memory 109 could represent high-bandwidth, low latency, non-persistent memory such as dynamic random-access memory (DRAM); various non-volatile random-access memory (NVRAM) technologies such as ferroelectric RAM, magnetoresistive RAM, phase-change RAM, millipede memory, or ferroelectric field-effect transistor (FeFET) memory; or non-volatile memory (NVM) technologies such as NAND flash, NOR flash, or INTEL 3D XPOINT® memory. The memories 109 can also be arranged into tiers. For example, the memory 109a may represent a higher-cost and higher-performance memory than the memory 109b, which is lower cost and lower performing. Due to the cost differential, less of the memory 109a would be installed in the computing device 100 than the lower cost memory 109b. Accordingly, the memory 109a might be associated with a first or higher-performance tier, while the memory 109b might be associated with a second or lower-performance tier.

Further, each of the memories 109 may be segmented or divided into one or more physical pages 113, such as the physical pages 113a of the memory 109a and the physical pages 113b of the memory 109b. Individual physical pages 113 can be allocated by the operating system 116 to a process 119 when the process 119 requests resources from the tiered memory 106. Accordingly, individual physical pages 113 can be mapped to a virtual or logical page in the virtual or logical address space of a process 119.

The tiered memory 106 can be presented or conceptualized as a single, unified memory resource to individual processes 119 executing on the computing device 100. However, individual virtual pages within the virtual address space of an individual process 119 may be mapped to any physical page 113 on any of the memories 109 that form the tiered memory 106. The allocation of individual physical pages 113 to a process 119 can be handled by the operating system 116.

The operating system 116 can include any system software that manages the operation of computer hardware and software resources of the computing device 100. The operating system 116 can also provide various services or functions to computer programs, such as processes 119, that are executed by the computing device 100. For example, the operating system 116 may schedule the operation of tasks or processes 119 by the processor 103 of the computing device 100. The operating system 116 may also provide virtual memory management functions to allow each process 119 executing on the computing device 100 to have its own logical or virtual address space, which the operating system 116 can map to physical addresses in the memories 109 of the tiered memory 106. When referring to the operating system 116, the operating system 116 can include both hypervisors and/or any other system software that manages computer hardware and software resources.

A process 119 can represent a collection of machine-readable instructions stored in the tiered memory 106 that, when executed by the processor 103 of the computing device 100, cause the computing device 100 to perform one or more tasks. A process 119 can represent a program, a sub-routine or sub-component of a program, a library used by one or more programs, etc. The term process 119 can include virtual machines as well as any other executing or executable computer program.

One or more allocation policies 123 can be stored on the computing device 100 and referenced by the operating system 116 to determine which physical pages 113 in a memory 109 to allocate to a process 119.

An access history 126 can store a record of page accesses by a process 119. In some implementations, the access history 126 can store a sample of physical pages 113 accessed by a process 119. This can be done as a performance optimization due to the performance impact involved in recording and storing a record of every access of a physical page 113 made by a process 119.

A migration map 129 can be used to track the movement or migration of the contents of physical pages 113 from one memory 109 to another memory 109. For example, if the contents of a physical page 113a of the memory 109a were copied or migrated to a physical page 113b in the memory 109b, the relationship between the physical page 113a and the physical page 113b could be stored in the migration map 129. This allows for the operating system 116 to avoid copying the contents of the physical page 113b back to the memory 109a as a later point in time if the contents of the physical page 113a have not changed.

It should be noted that any data or applications stored in the tiered memory 106 will be stored in the memory 109 that forms the tiered memory 106. For simplicity of illustration, the operating system 116, processes 119, allocation policy 123, access history 126, and migration map 129 are depicted in FIG. 1 as being stored in the tiered memory 106 generally, although portions of the operating system 116, processes 119, allocation policy 123, access history 126, and migration map 129 will be stored in the memory 109a and/or memory 109b.

Figure 2:
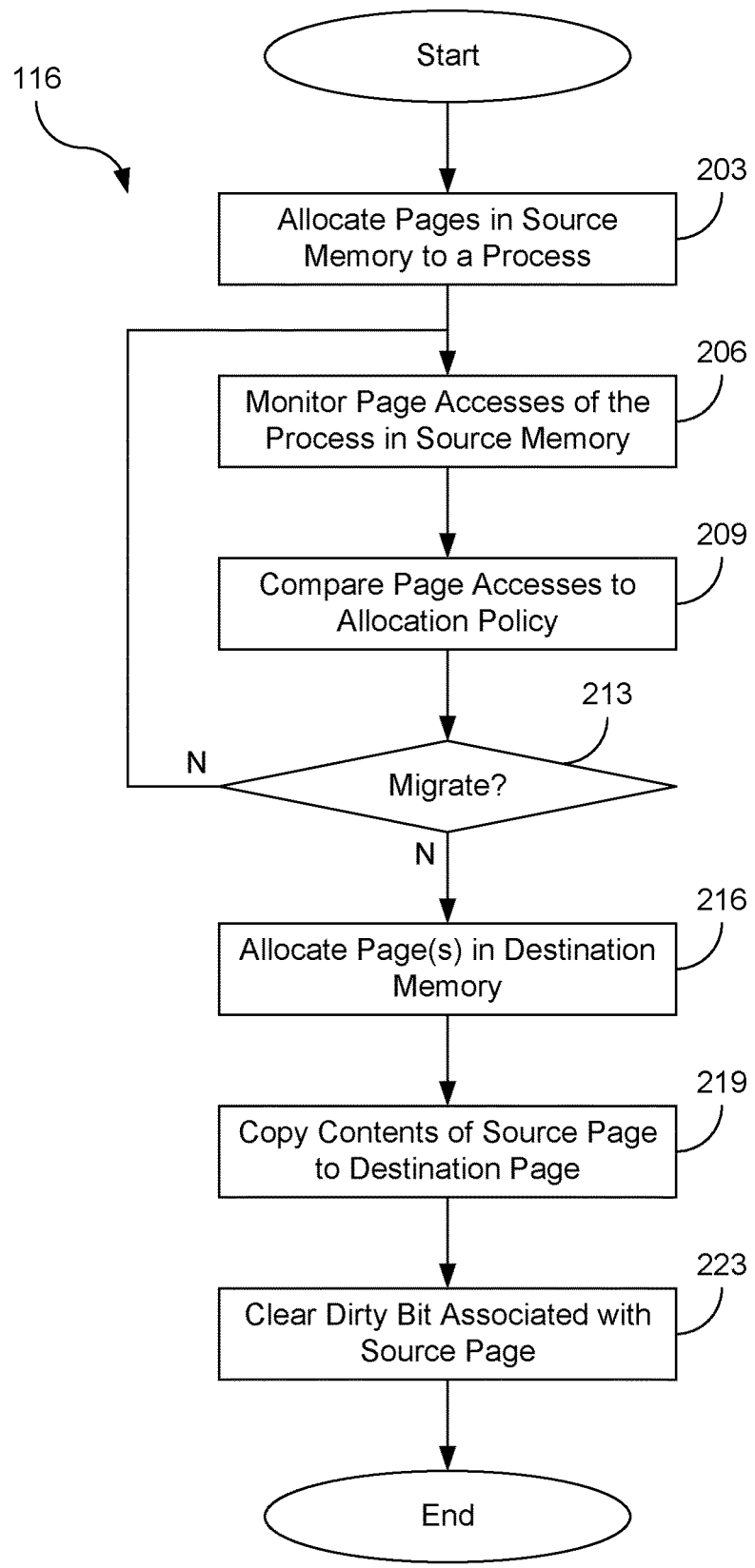
FIG. 2-5 are flowcharts illustrating examples of functionality implemented as portions of applications executed in a computing device of FIG. 1 according to various embodiments of the present disclosure.

Referring next to FIG. 2, shown is a flowchart that provides one example of the operation of a portion of the operating system 116 for migrating the contents of a physical page 113 within the tiered memory 106 from first or source memory 109a associated with a first memory tier to a second or destination memory 109b associated with a second memory tier. The flowchart of FIG. 2 provides merely an example of the many different types of functional arrangements that can be employed to implement the operation of the depicted portion of the operating system 116. As an alternative, the flowchart of FIG. 2 can be viewed as depicting an example of elements of a method implemented within the computing device 100.

Beginning with block 203, the operating system 116 can allocate one or more physical pages 113 in the memory 109a and/or the memory 109b to a process 119. Depending on the scenario, pages could be allocated exclusively from available physical pages 113a of the memory 109a, exclusively from available physical pages 113b from the memory 109b, or from a combination of physical pages 113a and physical pages 113b from the memory 109a and memory 109b. Various allocation strategies could be used for the initial allocation of physical pages 113 to the process 119.

A first approach for initially allocating physical pages 113 to a process 119 could be based at least in part on the priority of the process 119. For example, the operating system 116 could determine the priority assigned to the process 119. The operating system 116 could then evaluate an allocation policy 123 to determine which memory 109 in the tiered memory 106 to allocate physical pages 113 from. For example, the operating system 116 could compare the priority of the process 119 to a priority threshold specified by the allocation policy 123. For instance, if the priority of the process 119 matched or exceeded a priority threshold, then the process 119 could be allocated physical pages 113a from the memory 109a. Likewise, if the priority of the process 119 failed to meet or exceed the priority threshold, then the process 119 could be allocated physical pages 113b from the memory 109b.

A second approach for allocating physical pages 113 to a process 119 could be based on a comparison of the process 119 to previous instances of execution of the process 119 recorded in the access history 126. For example, the operating system 116 could search for a previous instance of execution of the process 119 recorded in the access history 126. The operating system 116 could then determine the frequency with which physical pages 113 were accessed by the previous instance of the process 119. Depending on the frequency of which the previous instance of the process 119 accessed physical pages 113, physical pages 113 could be allocated from the memory 109a or the memory 109b. For example, if previous instance of the process 119 accessed a first number of physical pages 113 with a frequency greater than or equal to a threshold frequency specified in the allocation policy 123, then the operating system 116 could allocate the first number of physical pages 113a from the memory 109a. Likewise, if the previous instance of the process 119 accessed a second number of physical pages 113 less than a threshold frequency specified in the allocation policy 123, then the operating system 116 could allocate the second number of physical pages 113b from the memory 109b.

Then at block 206, the operating system 116 can monitor page accesses by the process 119 for physical pages 113 allocated at block 203, referred to as the source physical pages 113 for the purposes of FIG. 2. For example, each time the process 119 accesses an allocated physical page 113, a record of the access could be recorded (e.g., to an entry in the access history 126 for the current process 119 or to a temporary data structure stored in memory). The record could include an identifier of the physical page 113 accessed and a counter indicating how many times the physical page 113 has been accessed, such as a total number of accesses and/or a number of accesses within an interval or period of time. In some instances, a sub-sample of accesses of the physical pages 113 allocated to the process 119 could be recorded in order to minimize any impact on the performance of the process 119 or the computing device 100.

The page fault handler of the operating system 116 could also be modified to assist in monitoring pages accesses by the process 119 for physical pages 113. For example, the operating system 116 could clear a present bit in a page table entry for each physical page 113. Then, in response to a page fault resulting from an attempt to access the physical page 113, the operating system 116 could increment an access counter that tracks the number of times the physical page 113 has been accessed. The operating system 116 could then clear the present bit in the page table entry for the physical page 113 subsequent to incrementing the access counter. This could be repeated each time the process 119 accesses the physical page 113, and the value of the access counter at the end of a predefined interval or period of time could be used to measure the number of times the physical page 113 has been accessed.

Moving on to block 209, the operating system 116 can compare the frequency of accesses of allocated physical pages 113 or the total number of accesses of allocated physical pages 113 to the allocation policy 123. This can be done to determine whether or not one or more of the source physical pages 113 should be migrated to destination physical pages 113. For example, if the process is currently allocated to physical pages 113a in the memory 109a, the comparison could be done in order to determine whether to copy the contents of one or more of the source physical pages 113a to destination physical pages 113b in the memory 109b.

Next, at block 213, the operating system 116 can determine whether to migrate the contents of the source physical pages 113a to one or more destination physical pages 113b. This can be done by comparing the frequency of page accesses to a threshold specified in the allocation policy 123. For example, if the source physical pages 113a of the first memory 109a are associated with high-performance memory (e.g., high bandwidth, low latency, etc.), and the second memory 109b is associated with low-performance memory (e.g., lower bandwidth, higher latency, etc.), then the operating system 116 could determine whether the frequency of page accesses fails to meet or exceed the threshold specified in the allocation policy 123. If the frequency of page accesses fails to meet or exceed the threshold specified in the allocation policy 123, this could indicate that the high-performance memory should be reallocated to another process 119 and the operating system 116 could determine that the contents of the source physical pages 113a should be migrated to the destination physical pages 113b in the memory 109b. However, if the source physical pages 113a of the first memory 109a are associated with low-performance memory (e.g., low bandwidth, high-latency, etc.), and the second memory 109b is associated with high-performance memory (e.g., higher bandwidth, lower latency, etc.), then the operating system 116 could determine whether the frequency of page accesses meets or exceeds the threshold specified in the allocation policy 123. If the frequency of page accesses meets or exceeds the threshold specified in the allocation policy 123, this could indicate that the process 119 should be migrated from the low-performance memory 109a to higher performance memory 109b. If the operating system 116 determines that the process should be migrated from source physical pages 113a to destination physical pages 113b, then the process can proceed to block 216. Otherwise, the process can return to block 206.

Proceeding to block 216, the operating system 116 can allocate destination physical pages 113b. Then, at block 219, the operating system 116 can copy the contents of the source physical page 113a to the destination physical pages 113b. As part of the allocation at block 216 or the copying at block 219, the operating system 116 can further record in the migration map 129 which of the destination physical pages 113b are associated with respective ones of the source physical pages 113a.

Subsequently, at block 223, the operating system 116 can clear the dirty bit associated with source physical pages 113a. The dirty bit can be cleared as a performance optimization in the event that the contents of the destination physical pages 113b are to be copied back to the memory 109a. If the contents of the source physical pages 113a and the destination physical pages 113b remain unchanged after the contents are copied at block 219, then the contents of the destination physical pages 113b do not need to be copied back to the first memory 109a in a subsequent migration. Instead, the operating system 116 can allocate the source physical pages 113a to the process 119. An example of the use of the dirty bit to optimize a return of the contents of the destination physical pages 113b back to the source physical pages 113a is illustrated in the following flowchart of FIG. 3.

Figure 3:
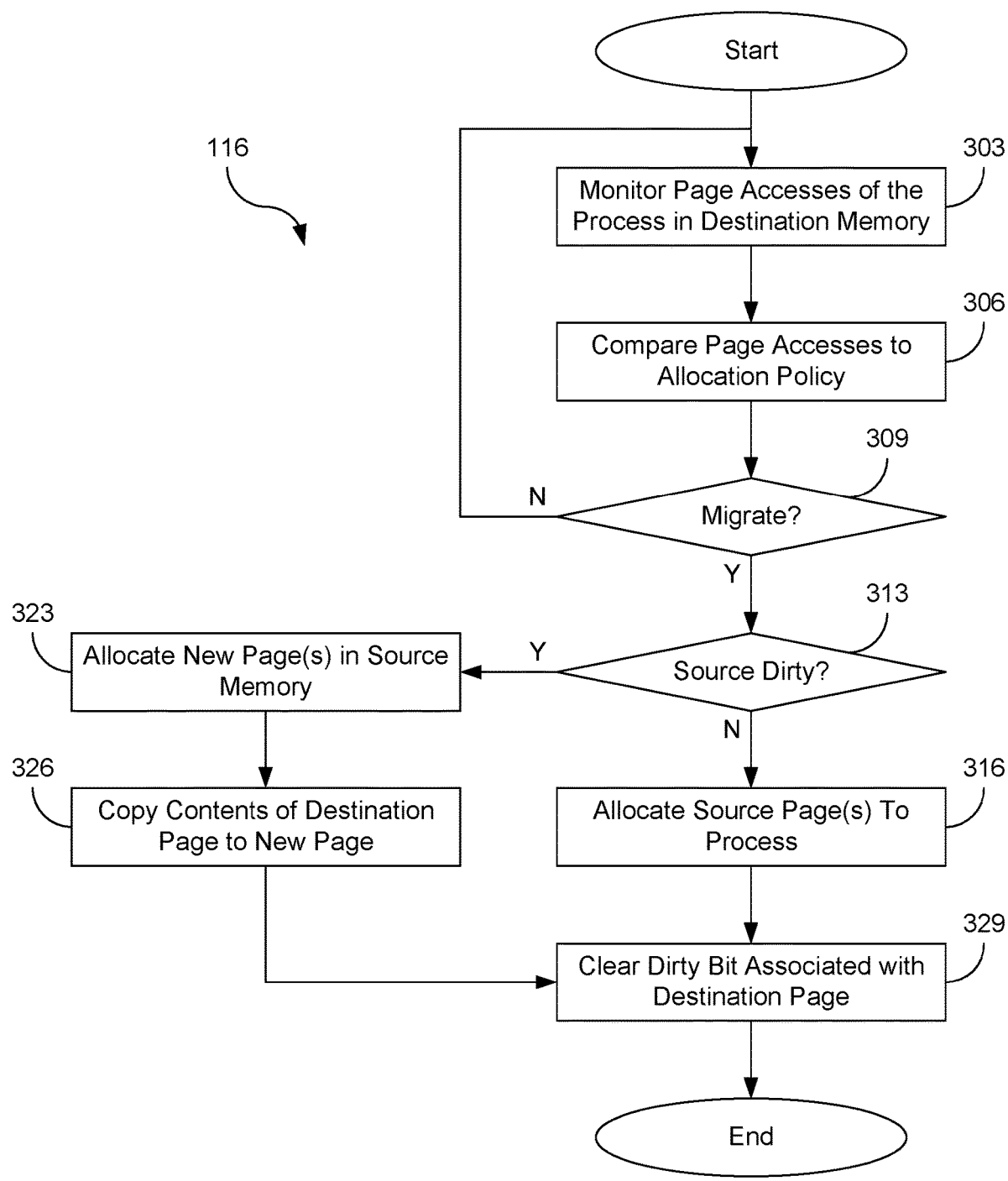

Referring next to FIG. 3, shown is a flowchart that provides one example of the operation of a portion of the operating system 116 migrating data from a destination set of physical pages 113b in a second memory 109b back to the first memory 109a. The flowchart of FIG. 3 provides merely an example of the many different types of functional arrangements that can be employed to implement the operation of the depicted portion of the operating system 116. As an alternative, the flowchart of FIG. 3 can be viewed as depicting an example of elements of a method implemented within the computing device 100.

Beginning with block 303, the operating system 116 can monitor page accesses by the process 119 for destination physical pages 113b in the destination memory 113b. For example, each time the process 119 accesses an allocated destination physical page 113b, a record of the access could be recorded (e.g., to an entry in the access history 126 for the current process 119 or to a temporary data structure stored in memory). The record could include an identifier of the destination physical page 113b accessed and a counter indicating how many times the destination physical page 113b has been accessed, such as a total number of accesses and/or a number of accesses within an interval or period of time. In some instances, a sub-sample of accesses of the destination physical pages 113b allocated to the process 119 could be recorded in order to minimize any impact on the performance of the process 119 or the computing device 100.

Then at block 306, the operating system 116 can compare the frequency of accesses of the destination physical pages 113b or the total number of accesses of destination physical pages 113b to the allocation policy 123. This can be done to determine whether or not one or more of the destination physical pages 113b should be migrated (e.g., back to source memory 109a). For example, if the process is currently allocated to physical pages 113b in the destination memory 109b, the comparison could be done in order to determine whether to copy the contents of one or more of the destination physical pages 113b back to one or more of the source physical pages 113a in the source memory 109a.

Moving on to block 309, the operating system 116 can determine whether to migrate the contents of the destination physical pages 113b back to one or more source physical pages 113a. This can be done by comparing the frequency of page accesses to a threshold specified in the allocation policy 123. For example, if the source physical pages 113*a* of the first memory 109*a* are associated with high-performance memory (e.g., high bandwidth, low latency, etc.), and the second memory 109*b* is associated with low-performance memory (e.g., lower bandwidth, higher latency, etc.), then the operating system 116 could determine whether the frequency of page accesses meets or exceed the threshold specified in the allocation policy 123. If the frequency of page accesses meets or exceeds the threshold specified in the allocation policy 123, this could indicate that the high-performance memory should be reallocated to the process 119 and the operating system 116 could determine that the contents of the destination physical pages 113*b* should be migrated back to the source physical pages 113*a* in the memory 109*a*. However, if the source physical pages 113*a* of the first memory 109*a* are associated with low-performance memory (e.g., low bandwidth, high-latency, etc.), and the second memory 109*b* is associated with high-performance memory (e.g., higher bandwidth, lower latency, etc.), then the operating system 116 could determine whether the frequency of page accesses fails to meet or exceed the threshold specified in the allocation policy 123. If the frequency of page accesses fails to meet or exceed the threshold specified in the allocation policy 123, this could indicate that the process 119 should be migrated from the higher performance memory 109*b* to lower performance memory 109*a*. If the operating system 116 determines that the process should be migrated from destination physical pages 113*b* back to the source physical pages 113*a*, then the process can proceed to block 311. Otherwise, the process can return to block 303.

Next, at block 311, the operating system 116 can determine whether the destination physical pages 113*b* are clean (e.g., the contents are unmodified since the contents of the source physical pages 113*a* were migrated to the destination physical pages 113*b* as depicted in FIG. 2). For example, the operating system 116 could first determine whether the contents of the source physical pages 113*a* have changes by determining whether the dirty bit associated with the source physical pages 113*a* remains clear. This evaluation of the source physical pages 113*a* can be done by querying or checking the migration map 129 to determine which of the source physical pages 113*a* were the source of the contents of the destination physical pages 113*b* to be migrated. Once the source physical pages 113*a* are identified by referencing the migration map 129, then operating system 116 can determine whether the dirty bit for the identified source physical pages 113*a* remains clear. If the dirty bit is set, indicating that the source physical pages 113*a* are dirty (e.g., they have been modified), then process can proceed to block 323. However, if the dirty bit remains clear, indicating that the source physical pages 113 are clean (e.g., they remain unmodified), then the process can proceed to block 313.

Proceeding to block 313, the operating system 116 can further check whether the source physical pages 113*a* have been reallocated or reassigned to a second process 119. For example, the source physical pages 113*a* may have been reassigned to a second process 119. If this were to have occurred, the dirty bit could be clear (e.g., because the second process 119 has cleared the dirty bit for its own purposes), but the contents of the source physical page(s) 113*a* could have been modified by the second process 119. Accordingly, if the source physical page(s) 113*a* have been allocated to a second process 119, then the (original) process would proceed to block 323. However, if source physical page(s) 113*a* have not been allocated to a second process 119, then the (original) process could proceed to block 316.

Moreover, it should be noted that the operations performed at block 311 can be performed in other orders than what is depicted. For example, the operations at block 313 could be performed prior to the operations at block 311 or in parallel to the operations at block 311.

Moving on to, at block 316, the operating system 116 can allocate the source page(s) 113*a* identified at block 311 to the process 119. This can be done to avoid the overhead associated with the copying of the contents back from the destination physical pages 113*b* to the original source physical pages 113*a* since the contents of the source physical pages 113*a* are identical to the destination physical pages 113*b*.

However, if the process proceeded alternatively to block 323, then the operating system 116 can allocate new source physical pages 113*a* to the process 119. Once allocated, at block 326 the operating system can then copy the contents of the destination physical pages 113*b* to the source physical pages 113*a* allocated at block 323.

Subsequently, at block 329, the operating system 116 can clear the dirty bit associated with the destination physical pages 113*b*. The dirty bit can be cleared as a performance optimization in the event that the contents of the source physical pages 113*a* are to be copied back again to the destination physical pages 113*b* in the destination memory 109*b* using the previously described process.

Figure 4:
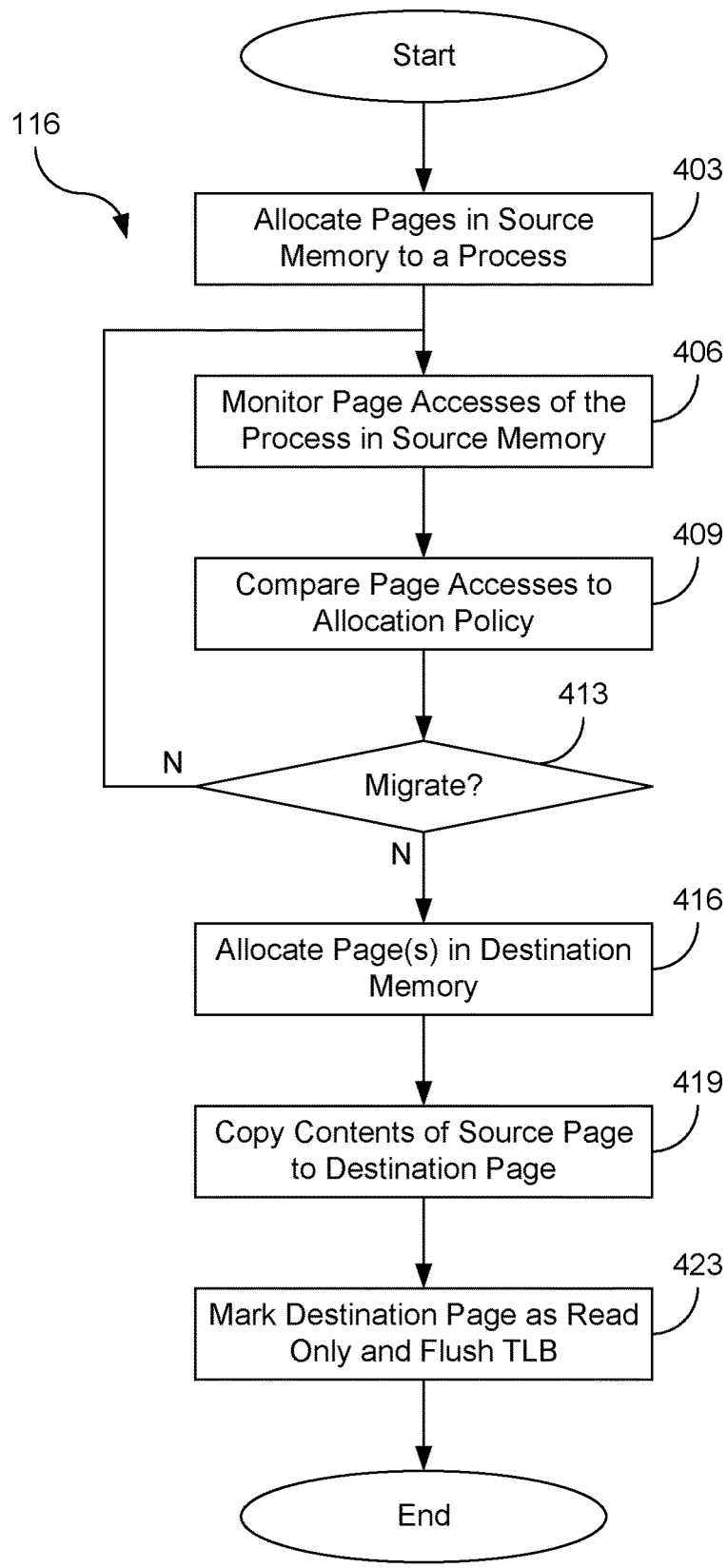

Referring next to FIG. 4, shown is a flowchart that provides one example of the operation of a portion of the operating system 116 for migrating the contents of a physical page 113 within the tiered memory 106 from first or source memory 109*a* associated with a first memory tier to a second or destination memory 109*b* associated with a second memory tier. The flowchart of FIG. 4 provides merely an example of the many different types of functional arrangements that can be employed to implement the operation of the depicted portion of the operating system 116. As an alternative, the flowchart of FIG. 4 can be viewed as depicting an example of elements of a method implemented within the computing device 100.

Beginning with block 403, the operating system 116 can allocate one or more physical pages 113 in the memory 109*a* and/or the memory 109*b* to a process 119. Depending on the scenario, pages could be allocated exclusively from available physical pages 113*a* of the memory 109*a*, exclusively from available physical pages 113*b* from the memory 109*b*, or from a combination of physical pages 113*a* and physical pages 113*b* from the memory 109*a* and memory 109*b*. Various allocation strategies could be used for the initial allocation of physical pages 113 to the process 119.

A first approach for initially allocating physical pages 113 to a process 119 could be based at least in part on the priority of the process 119. For example, the operating system 116 could determine the priority assigned to the process 119. The operating system 116 could then evaluate an allocation policy 123 to determine which memory 109 in the tiered memory 106 to allocate physical pages 113 from. For example, the operating system 116 could by compare the priority of the process 119 to a priority threshold specified by the allocation policy 123. For instance, if the priority of the process 119 matched or exceeded a priority threshold, then the process 119 could be allocated physical pages 113*a* from the memory 109*a*. Likewise, if the priority of the process 119 failed to meet or exceed the priority threshold, then the process 119 could be allocated physical pages 113*b* from the memory 109*b*.

A second approach for allocating physical pages 113 to a process 119 could be based on a comparison of the process 119 to previous instances of execution of the process 119 recorded in the access history 126. For example, the operating system 116 could search for a previous instance of execution of the process 119 recorded in the access history 126. The operating system 116 could then determine the frequency with which physical pages 113 were accessed by the previous instance of the process 119. Depending on the frequency of which the previous instance of the process 119 accessed physical pages 113, physical pages 113 could be allocated from the memory 109a or the memory 109b. For example, if previous instance of the process 119 accessed a first number of physical pages 113 with a frequency greater than or equal to a threshold frequency specified in the allocation policy 123, then the operating system 116 could allocate the first number of physical pages 113a from the memory 109a. Likewise, if the previous instance of the process 119 accessed a second number of physical pages 113 less than a threshold frequency specified in the allocation policy 123, then the operating system 116 could allocate the second number of physical pages 113b from the memory 109b.

Then at block 406, the operating system 116 can monitor page accesses by the process 119 for physical pages 113 allocated at block 403, referred to as the source physical pages 113 for the purposes of FIG. 4. For example, each time the process 119 accesses an allocated physical page 113, a record of the access could be recorded (e.g., to an entry in the access history 126 for the current process 119 or to a temporary data structure stored in memory). The record could include an identifier of the physical page 113 accessed and a counter indicating how many times the physical page 113 has been accessed, such as a total number of accesses and/or a number of accesses within an interval or period of time. In some instances, a sub-sample of accesses of the physical pages 113 allocated to the process 119 could be recorded in order to minimize any impact on the performance of the process 119 or the computing device 100.

Moving on to block 409, the operating system 116 can compare the frequency of accesses of allocated physical pages 113 or the total number of accesses of allocated physical pages 113 to the allocation policy 123. This can be done to determine whether or not one or more of the source physical pages 113 should be migrated to destination physical pages 113. For example, if the process is currently allocated to physical pages 113a in the memory 109a, the comparison could be done in order to determine whether to copy the contents of one or more of the source physical pages 113a to destination physical pages 113b in the memory 109b.

Next, at block 413, the operating system 116 can determine whether to migrate the contents of the source physical pages 113a to one or more destination physical pages 113b. This can be done by comparing the frequency of page accesses to a threshold specified in the allocation policy 123. For example, if the source physical pages 113a of the first memory 109a are associated with high-performance memory (e.g., high bandwidth, low latency, etc.), and the second memory 109b is associated with low-performance memory (e.g., lower bandwidth, higher latency, etc.), then the operating system 116 could determine whether the frequency of page accesses fails to meet or exceed the threshold specified in the allocation policy 123. If the frequency of page accesses fails to meet or exceed the threshold specified in the allocation policy 123, this could indicate that the high-performance memory should be reallocated to another process 119 and the operating system 116 could determine that the contents of the source physical pages 113a should be migrated to the destination physical pages 113b in the memory 109b. However, if the source physical pages 113a of the first memory 109a are associated with low-performance memory (e.g., low bandwidth, high-latency, etc.), and the second memory 109b is associated with high-performance memory (e.g., higher bandwidth, lower latency, etc.), then the operating system 116 could determine whether the frequency of page accesses meets or exceeds the threshold specified in the allocation policy 123. If the frequency of page accesses meets or exceeds the threshold specified in the allocation policy 123, this could indicate that the process 119 should be migrated from the low-performance memory 109a to higher performance memory 109b. If the operating system 116 determines that the process should be migrated from source physical pages 113a to destination physical pages 113b, then the process can proceed to block 416. Otherwise, the process can return to block 406.

Proceeding to block 416, the operating system 116 can allocate destination physical pages 113b. Then, at block 419, the operating system 116 can copy the contents of the source physical page 113a to the destination physical pages 113b. As part of the allocation at block 416 or the copying at block 419, the operating system 116 can further record in the migration map 129 which of the destination physical pages 113b are associated with respective ones of the source physical pages 113a.

Subsequently, at block 423, the operating system 116 can mark the destination physical pages 113b as read-only and then flush the translation look-aside buffer (TLB) of the processor 103. Should another process 119 attempt to modify the contents of the destination physical pages 113b, a page fault would be generated and the page-fault handler of the operating system 116 could set a changed flag associated with the modified destination physical page(s) 113b. The changed flag could be stored in the page table of the computing device 100, in the migration map 129, or in the destination physical pages 113b themselves. This can be done as a performance optimization in the event that the contents of the destination physical pages 113b are to be copied back to the memory 109a. If the contents of the destination physical pages 113b remain unchanged after the contents are copied at block 419, then the contents of the destination physical pages 113b do not need to be copied back to the first memory 109a in a subsequent migration. Instead, the operating system 116 can allocate the source physical pages 113a to the process 119. An example of the use of the changed flag to optimize a return of the contents of the destination physical pages 113b back to the source physical pages 113a is illustrated in the following flowchart of FIG. 5.

Figure 5:
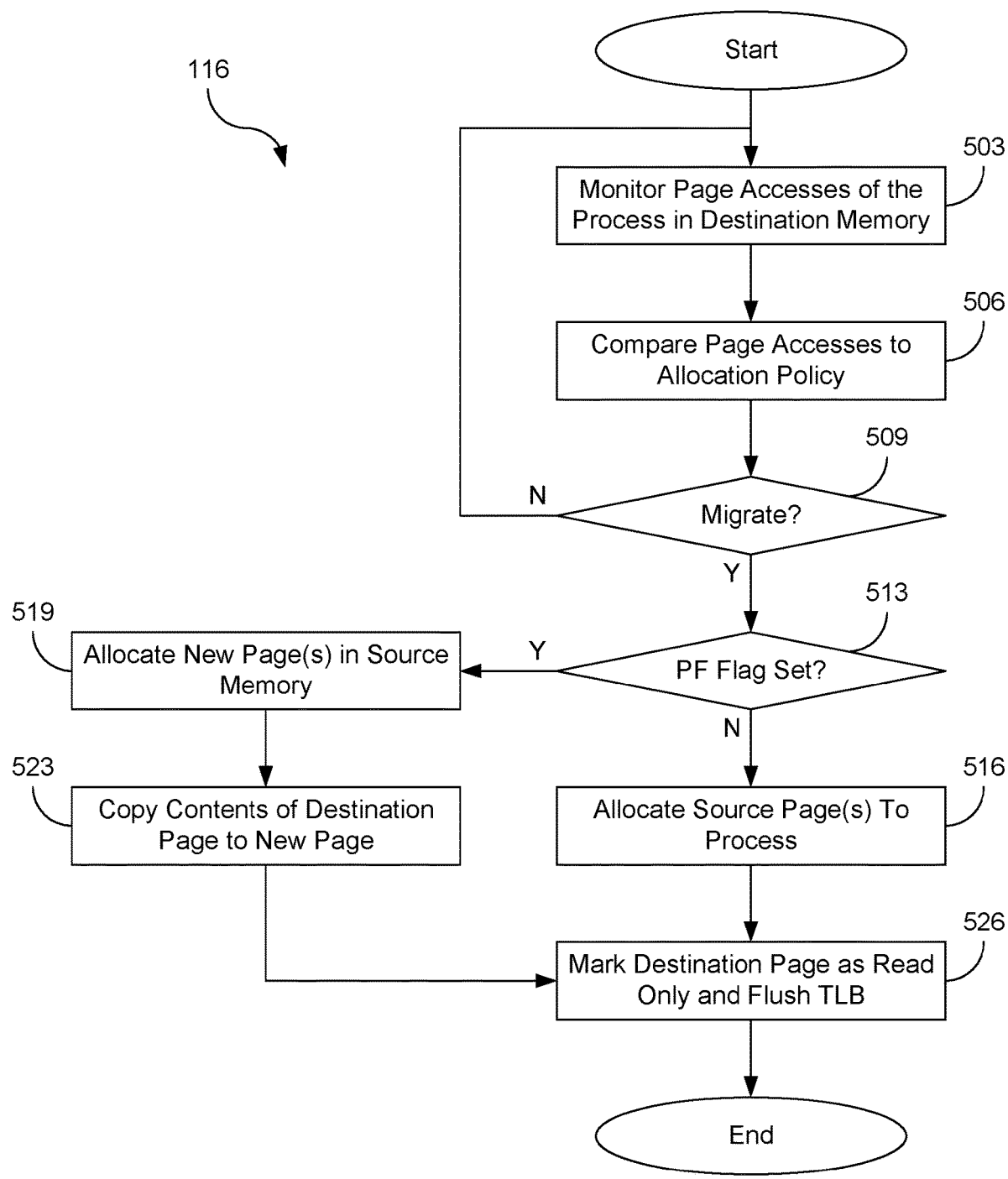

Referring next to FIG. 5, shown is a flowchart that provides one example of the operation of a portion of the operating system 116 migrating data from a destination set of physical pages 113b in a second memory 109b back to the first memory 109a. The flowchart of FIG. 5 provides merely an example of the many different types of functional arrangements that can be employed to implement the operation of the depicted portion of the operating system 116. As an alternative, the flowchart of FIG. 5 can be viewed as depicting an example of elements of a method implemented within the computing device 100.

Beginning with block 503, the operating system 116 can monitor page accesses by the process 119 for destination physical pages 113b in the destination memory 113b. For example, each time the process 119 accesses an allocated destination physical page 113b, a record of the access could be recorded (e.g., to an entry in the access history 126 for the current process 119 or to a temporary data structure stored in memory). The record could include an identifier of the destination physical page 113*b* accessed and a counter indicating how many times the destination physical page 113*b* has been accessed, such as a total number of accesses and/or a number of accesses within an interval or period of time. In some instances, a sub-sample of accesses of the destination physical pages 113*b* allocated to the process 119 could be recorded in order to minimize any impact on the performance of the process 119 or the computing device 100.

Then at block 506, the operating system 116 can compare the frequency of accesses of the destination physical pages 113*b* or the total number of accesses of destination physical pages 113*b* to the allocation policy 123. This can be done to determine whether or not one or more of the destination physical pages 113*b* should be migrated (e.g., back to source memory 109*a*). For example, if the process is currently allocated to physical pages 113*b* in the destination memory 109*b*, the comparison could be done in order to determine whether to copy the contents of one or more of the destination physical pages 113*b* back to one or more of the source physical pages 113*a* in the source memory 109*a*.

Moving on to block 509, the operating system 116 can determine whether to migrate the contents of the destination physical pages 113*b* back to one or more source physical pages 113*a*. This can be done by comparing the frequency of page accesses to a threshold specified in the allocation policy 123. For example, if the source physical pages 113*a* of the first memory 109*a* are associated with high-performance memory (e.g., high bandwidth, low latency, etc.), and the second memory 109*b* is associated with low-performance memory (e.g., lower bandwidth, higher latency, etc.), then the operating system 116 could determine whether the frequency of page accesses meets or exceed the threshold specified in the allocation policy 123. If the frequency of page accesses meets or exceeds the threshold specified in the allocation policy 123, this could indicate that the high-performance memory should be reallocated to the process 119 and the operating system 116 could determine that the contents of the destination physical pages 113*b* should be migrated back to the source physical pages 113*a* in the memory 109*a*. However, if the source physical pages 113*a* of the first memory 109*a* are associated with low-performance memory (e.g., low bandwidth, high-latency, etc.), and the second memory 109*b* is associated with low-performance memory (e.g., lower bandwidth, higher latency, etc.), then the operating system 116 could determine whether the frequency of page accesses fails to meet or exceed the threshold specified in the allocation policy 123. If the frequency of page accesses fails to meet or exceed the threshold specified in the allocation policy 123, this could indicate that the process 119 should be migrated from the higher performance memory 109*b* to lower performance memory 109*a*. If the operating system 116 determines that the process should be migrated from destination physical pages 113*b* back to the source physical pages 113*a*, then the process can proceed to block 513. Otherwise, the process can return to block 503.

Next, at block 513, the operating system 116 can check the changed flag associated with the destination physical pages 113*b* to determine if the contents of the destination physical pages 113*b* have changed. This determination can be done, for example, by evaluating the changed flag associated with the destination physical pages 113*b* to determine if their contents have changed. If the destination physical pages 113*b* are unchanged, then the process can proceed to block 516. Otherwise, if the destination physical pages 113*b* have changed, the process can proceed to block 519.

Then, at block 516, the operating system 116 can allocate the source page(s) 113*a* to the process 119. The determination of the source page(s) can be done, for example, by querying or checking the migration map 129 to determine which of the source physical pages 113*a* were the source of the contents of the destination physical pages 113*b* to be migrated. The allocation of the source page(s) 113*a* to the process 119 can be done to avoid the overhead associated with the copying of the contents back from the destination physical pages 113*b* to the original source physical pages 113*a* since the contents of the source physical pages 113*a* are identical to the destination physical pages 113*b*.

However, if the process proceeded alternatively to block 519, then the operating system 116 can allocate new source physical pages 113*a* to the process 119. Once allocated, the operating system can then copy the contents of the destination physical pages 113*b* to the source physical pages 113*a* allocated at block 523.

Subsequently, at block 526, the operating system 116 can mark the destination physical pages 113*b* as read-only and then flush the translation look-aside buffer (TLB) of the processor 103. Should another process 119 attempt to modify the contents of the destination physical pages 113*b*, a page fault would be generated and the page-fault handler of the operating system 116 could set a changed flag associated with the modified destination physical page(s) 113*b*. The changed flag could be stored in the page table of the computing device 100, in the migration map 129, or in the destination physical pages 113*b* themselves. This could be done in the event that the contents of the source physical pages 113*a* are to be copied back again to the destination physical pages 113*b* in the destination memory 109*b* using the previously described process.

Figure 6:
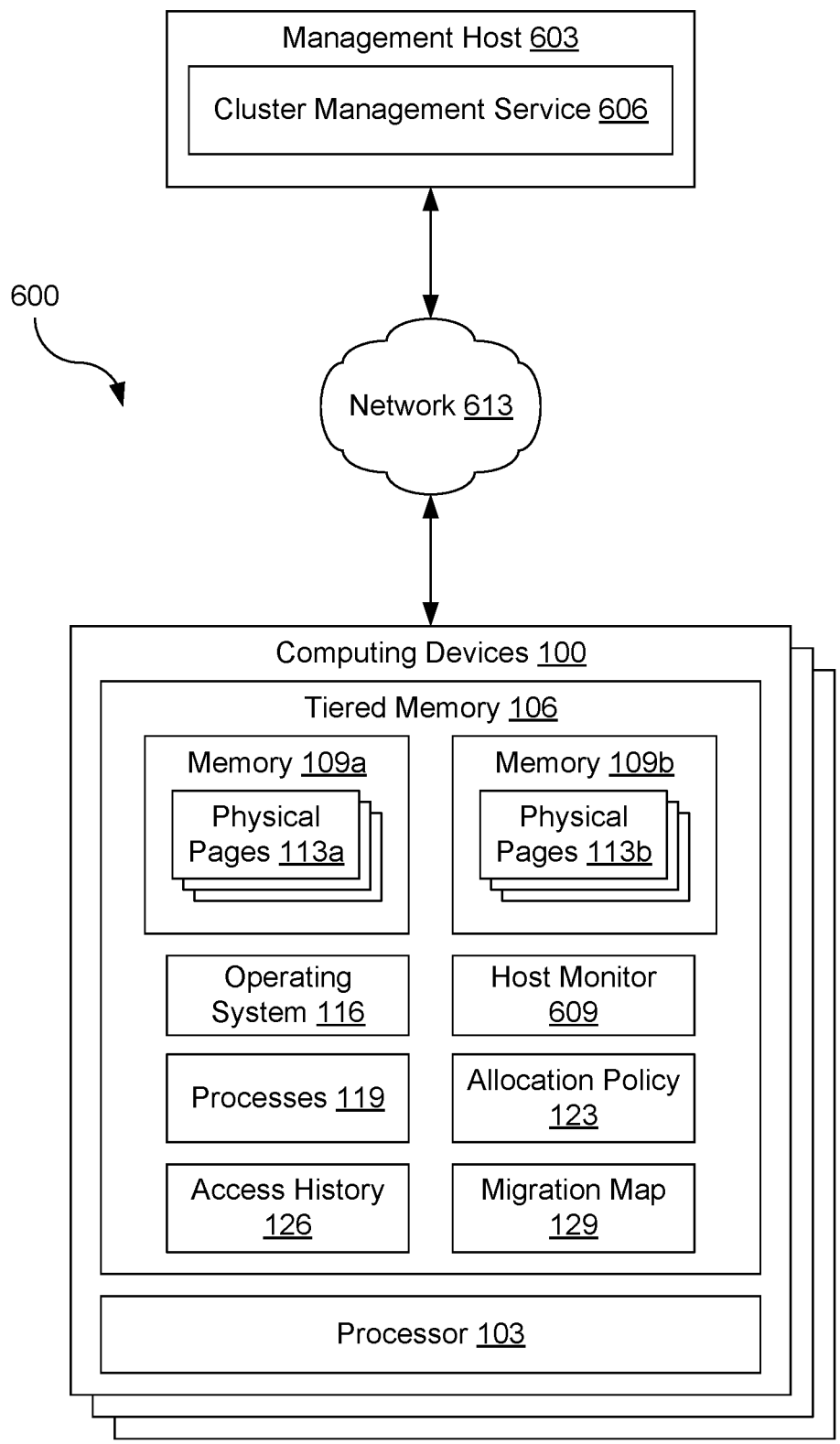
FIG. 6 is a drawing depicting a cluster computing environment or network environment according to various embodiments of the present disclosure.

FIG. 6 depicts an example of a network environment 600 according to various embodiments of the present disclosure. The network environment 600 could represent, for example, a computing cluster or distributed computing environment with one or more computing devices 100 in data communication with each other for load balancing or resource sharing purposes. The network environment 600 could also include a management host 603 in data communication with the computing devices 100. The management host 603 could be implemented as a separate computing device that executes a cluster management service 606 to help manage the collective computing resources of the computing devices 100. Each computing device 100 could also have a host monitor 609 locally installed and executed to assist the cluster management service 606 in managing the collective computing resources of the computing devices 100. Moreover, the management host 603 and the computing devices 100 can be connected to each other through a network 613 to enable data communication between the computing devices 100 or between the computing devices 100 and the management host 603.

The network 613 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLU-ETOOTH® networks, microwave transmission networks, as well as other networks relying on radio broadcasts. The network 613 can also include a combination of two or more networks 613. Examples of networks 613 can include the Internet, intranets, extranets, virtual private networks (VPNs), and similar networks.

The cluster management service 606 can be executed to determine an appropriate host computing device 100 to initially place a process 119. The cluster management service 606 can also be executed to intermittently or periodically reevaluate placement decisions and, if appropriate, initiate a migration of a process 119 from a current host computing device 100 to a new host computing device 100.

The host monitor 609 can be executed to perform a number of functions related to the management of processes 119 in conjunction with the cluster management service 606. For example, the host monitor 609 could be executed to determine the size of each tier of memory 109 in the tiered memory 106 to allocate to a process 119 assigned to the host computing device 100 by the cluster management service 606. The host monitor 609 could also be implemented to monitor the performance of host computing device 100 generally or the performance of the tiered memory 106 or memories 109a and/or 109b to determine whether a process 119 should be migrated to another host computing device 100.

Figure 7:
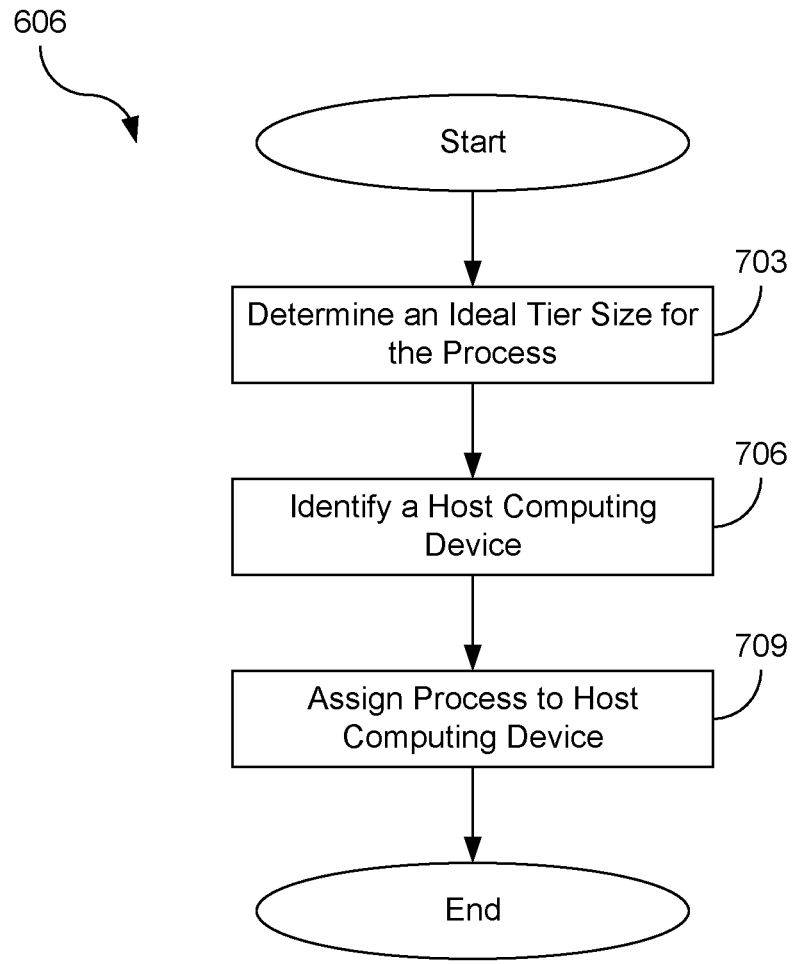
FIGS. 7-9 are flowcharts illustrating examples of functionality implemented as portions of applications executed in network environment of FIG. 6 according to various embodiments of the present disclosure.

Referring next to FIG. 7, shown is a flowchart that provides one example of the operation of a portion of the cluster management service 606. The flowchart of FIG. 7 provides merely an example of the many different types of functional arrangements that can be employed to implement the operation of the depicted portion of the cluster management service 606. As an alternative, the flowchart of FIG. 7 can be viewed as depicting an example of elements of a method implemented within the network environment 600.

Beginning at block 703, the cluster management service 606 can determine an ideal tier size for a process 119. If individual computing device 100 in the cluster have multiple memories 109 available for tiered memory 106, then the cluster management service 606 can determine the ideal tier size for the first memory 109a, the second memory 109b, etc. The cluster management service 606 can determine the ideal tier size for the process 119 using a number of approaches.

In the first approach, the cluster management service 606 could calculate the ideal tier sizes based on the stated total memory requirement for the process 119. For example, virtual machines are often configured to use a maximum amount of memory allocated to the virtual machine. Accordingly, the cluster management service 606 could use the maximum amount of memory or total memory requirement specified for the process 119 to calculate the ideal tier sizes. For example, the cluster management service 606 could calculate the ideal tier size for a first memory 109a as a first predefined percentage of the total memory requirement (e.g., 25% of the total memory requirement is to be allocated to a higher performance memory tier). The cluster management service 606 could then calculate the ideal tier size for the second memory 109b as a second predefined percentage of the total memory requirement (e.g., 75% of the total memory requirement is to be allocated to a lower performance memory tier).

In a second approach, the cluster management service 606 could evaluate previous page accesses associated with a previous instance of the process 119. For example, the cluster management service 606 could store copies of the access history 126 of individual host computing devices 100 as a reference (e.g., because the information was provided by the host monitor 609). The cluster management service 606 could search the access history 126 to determine the previous page accesses of a previous instance of the process 119. The cluster management service 606 could subsequently determine the ideal tier size for the first memory 109a and the second memory 109b of tiered memory 106 based at least in part on the page accesses associated with the previous instance of the process 119.

In a third approach, the cluster management service 606 could use a knowledge base or other technical reference to determine the ideal tier size for the first memory 109a and the second memory 109b of tiered memory 106. For instance, the cluster management service 606 could determine the name of the process 119. The cluster management service 606 could then search a knowledge base or other technical reference for an article or reference specifying the technical requirements for the process 119, such as the minimum or recommended amount of memory. The cluster management service 606 could then determine the ideal tier size for the first memory 109a and the second memory 109b of tiered memory 106 based at least in part on the amount of memory specified by the knowledge base or technical reference. For example, the cluster management service 606 could calculate the ideal tier size for a first memory 109a as a first predefined percentage of the minimum or recommended amount of memory (e.g., 25% of the total memory requirement is to be allocated to a higher performance memory tier). The cluster management service 606 could then calculate the ideal tier size for the second memory 109b as a second predefined percentage of the minimum or recommended amount of memory (e.g., 75% of the total memory requirement is to be allocated to a lower performance memory tier).

Then, at block 706, the cluster management service 606 can identify a host computing device 100 that can accommodate the ideal tier size for the first memory 109a and the second memory 109b. This could be done using a variety of approaches. For example, the cluster management service 606 could search for a first host computing device 100, from among a plurality of host computing devices 100, that has sufficient tiered memory space for the ideal tier size for the first memory 109a and the second memory 109b. As another example, the cluster management service 606 could solve a numerical optimization problem that maximizes the number of processes 119 that can be matched to individual ones of a plurality of host computing devices 100 under a constraint that each of the processes 119 ideal tier sizes fit on respective host computing devices 100 for which they are matched.

Subsequently, at block 709, the cluster management service 606 can assign the process 119 to the host computing device 100 selected at block 706. Moreover, the cluster management service 606 can intermittently reevaluate an assignment of the process 119 to the host computing device 100. The cluster management service 606 can also reevaluate the assignment of the process 119 in response to a message or request from the host monitor 609 indicating that the process 119 should be considered for reassignment to another host computing device 100.

Figure 8:
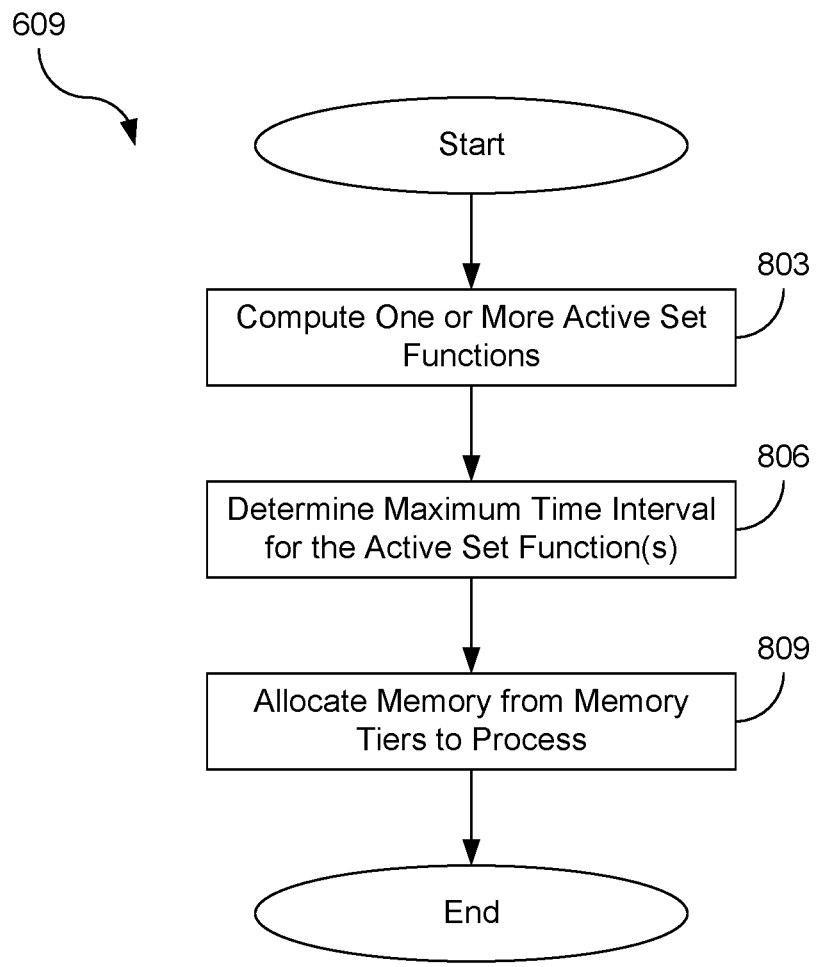

Referring next to FIG. 8, shown is a flowchart that provides one example of the operation of a portion of the host monitor 609. The flowchart of FIG. 8 provides merely an example of the many different types of functional arrangements that can be employed to implement the operation of the depicted portion of the host monitor 609. As an alternative, the flowchart of FIG. 8 can be viewed as depicting an example of elements of a method implemented within the network environment 600.

Beginning at block 803, the host monitor 609 can compute one or more active set functions for the process 119. An active set function indicates the number of different physical pages 113 in a memory 109 that a process 119 has recently accessed as a function of the duration of time. To compute the active set functions for the process 119, the host monitor 609 can observe for the process 119 the number of different physical pages 113 in a memory 109 that the process 119 has recently accessed for different durations of time, which can range from a few seconds to a few minutes, in order to obtain a monotonically increasing function mapping a time duration to a number of physical pages 113 accessed by a process 119.

With a single tier, a random set of physical pages 113 (e.g., physical pages 113a in memory 109a) allocated to the process 119 can be monitored. The host monitor 609 can compute the fraction of the monitored physical pages 113 that were accessed. The fraction can then be multiplied by the total number of physical pages 113 allocated to the process 119 to determine an estimate of the total number of physical pages 113 accessed by the process 119 within the period of time spent monitoring page accesses. The estimated total number of physical pages 113 can be integrated into a weighted moving average. This procedure is done for different periods of time to determine the entire active set function.

If multiple tiers of memory 109 in the tiered memory 106 are involved, then an active set function can be computed for each of the memories 109 (e.g., a first active set function can be computed for memory 109a, a second active set function can be computed for memory 109b, etc.). That is, for each memory 109 in the tiered memory 106, the host monitor 609 can monitor a random set of physical pages 113 accessed by the process 119, compute the fraction of monitored physical pages 113 that were accessed for each time duration, multiply the fraction by the total number of physical pages 113 in the memory 109 allocated to the process 119, to obtain a sample of number of physical pages 113 for each time duration. The host monitor 609 can then integrate the sample into a weighted moving average. The host monitor 609 can thus obtain a function for each tier of memory 109 in the tiered memory 106. Next, we combine these functions to obtain a single function that represents the number of accesses the process 119 would have made if all its physical pages 113 were mapped in the fastest tier of memory 109. To combine these functions, the host monitor 609 can compute a weighted average pointwise (for each time duration) of each function, where the weight equals the ratio of the speed of fastest tier over the speed of the given tier. For example, suppose there are three tiers $T_1$, $T_2$, $T_3$, and hence three functions $F_1(t)$, $F_2(t)$, $F_3(t)$. If tier $T_1$ is twice as fast as tier $T_2$, and three times as fast as tier $T_3$, then $F(t)=F_1(t)+2 F_2(t)+3 F_3(t)$. If the process has accessed $F_2(t)$ and $F_3(t)$ pages in tiers $T_2$ and $T_3$, then it would have accessed $2 F_2(t)$ and $3 F_3(t)$ pages if those pages were in tier $T_1$ instead of tier $T_2$ and tier $T_3$.

Then, at block 806, the host monitor 609 can determine a maximum time interval for the active set functions. The goal for the host monitor 609 would be to determine the largest time duration t, such that all processes 119 can fit their active set tin the fastest tier of memory 109 in the tiered memory 106. This can be done by computing $$t_1 = \max t : \Sigma_p F^p(t) < \text{size}(T_1)$$

In this formula, $F^p(t)$ is the active set function for a process p, so the summand above considers the active set function of all processes.

The highest performing tier of memory 109 in the tiered memory 106 is the most important for the performance of processes 119. Therefore, the host monitor 609 can be configured to attempt to maximize the time duration $t_1$ at which processes 119 can execute within the fastest tier of memory 109 in the tiered memory 106. The implicit assumption is that other mechanisms will ensure that, during $t_1$, the physical pages 113 accessed by the process will be mapped in the fastest tier using one or more mechanisms described in the present disclosure. Once $t_1$ is calculated, the host monitor 609 can cause the operating system 116 to allocate $F^p(t_1)$ pages in tier $T_1$ for each process p.

To calculate the size of the other tiers for each process 119, a generalized version of the previously discussed approach can be used. For tier $T_2$, the host monitor 609 can determine the largest time duration $t_2$ such that all processes 119 can fit their active set for $t_2$ in the combination of tiers $T_1$ and $T_2$. In other words, the host monitor 609 can compute:

$$t_2 = \max t : \Sigma_p F^p(t) < \text{size}(T_1) + \text{size}(T_2)$$

The host monitor 609 can then allocate $F^p(t_2) - F^p(t_1)$ pages in tier $T_2$ for each process P.

In general, for tier $T_j$, the host monitor 609 can compute $$t_j = \max t : \sum_p F^p(t) < \sum_{i=1}^{j} \text{size}(T_i)$$

Then, the host monitor 609 can allocate $A_j^p := F^p(t_j) - F^p(t_{j-1})$ pages in tier $T_j$ for each process p.

The host monitor 609 can observe that the calculation above uses an estimate $F^p(t)$ that assumes all accesses of a process 119 occur at the speed of the fastest tier $T_1$, while in reality accesses to the other tiers of memory 109 are slower. The host monitor 609 can correct for this issue by scaling down the number of accesses to the slower tier. Specifically, once the host monitor 609 computes $t_1$, the host monitor 609 can compute $t_2$ as follows:

$$t_2 = (1/M_2) \cdot (\max t : \Sigma_p F^p(t) - F^p(t_1) < \text{size}(T_2))$$

where $M_2$ is the relative speed of tier $T_1$ over $T_2$ (e.g., if tier $T_1$ is twice the speed of tier $T_2$, then $M_2=2$). This formula can be simplified given that $\Sigma_p F^p(t_1) \cong \text{size}(T_1)$:

$$t_2 = \max t : \Sigma_p F^p(t) < \text{size}(T_1) + M_2 \cdot \text{size}(T_2)$$

In general:

$$t_j = \max t : \sum_p F^p(t) < \sum_{i=1}^{j} M_i \cdot \text{size}(T_i)$$

where the host monitor 609 takes for convenience $M_1=1$. Once the $t_j$'s are computed, physical pages 113 can be allocated in tier $T_j$ but scaled by a factor of $(1/M_j)$. Accordingly, the host monitor 609 can allocate $$A_j^p := (1/M_j)(F^p(t_j) - F^p(t_{j-1}))$$

pages for tier $T_j$.

This approach assumes that the physical pages 113 accessed by a process 119 in an interval will be from the fastest possible tier of memory 109. Although the present disclosure discusses mechanisms for allocating physical pages 113 to a process 119 from the fastest possible memory 109 in the tiered memory 106, there may be edge cases where this fails to occur. Therefore, some implementations of the present disclosure can allocate a slightly larger number of physical pages 113 from the faster tiers than the number indicated above. One way to do that is to inflate function $F^p(t)$ by a small factor, say $\alpha^p=1.1$. In these implementations, in the formulas above would replace $F^p(t)$ with $F^p(t):=F^p(t)\cdot\alpha^p$.

Subsequently, at block 809, the host monitor 609 can allocate physical pages 113 from the memories 109 in the tiered memory 106. The number of physical pages 113 to be allocated from a memory 109 in the tiered memory 106 can be based at least in part on the determination made previously at block 806.

Figure 9:
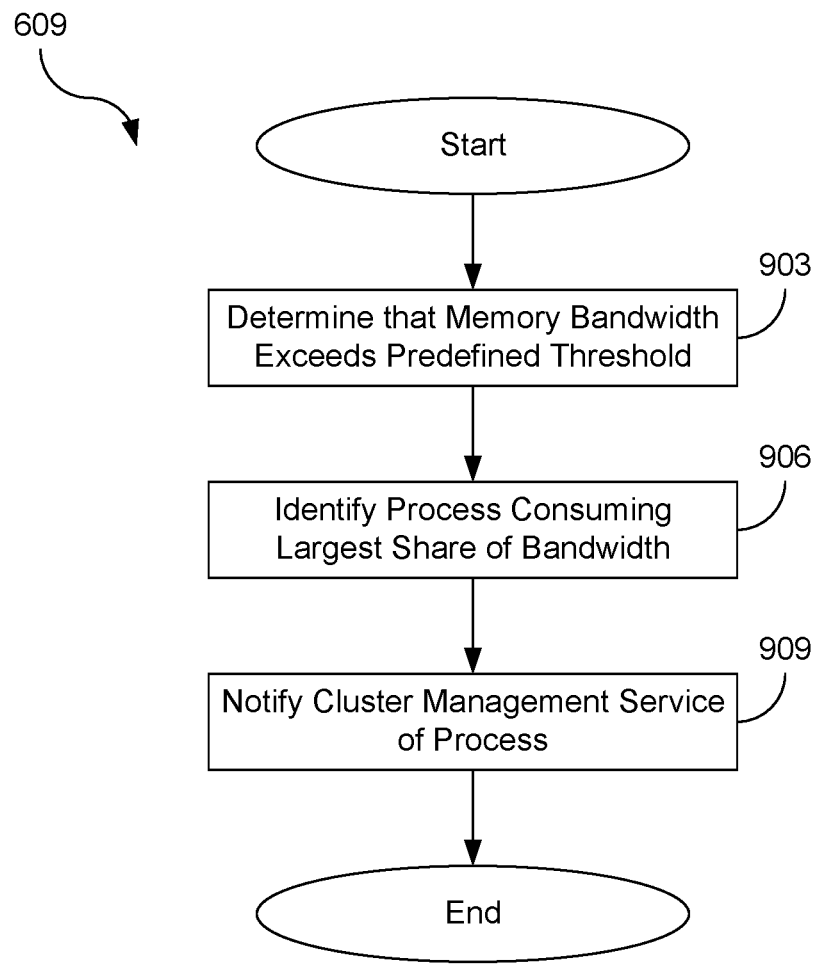

Referring next to FIG. 9, shown is a flowchart that provides one example of the operation of a portion of the host monitor 609. The flowchart of FIG. 9 provides merely an example of the many different types of functional arrangements that can be employed to implement the operation of the depicted portion of the host monitor 609. As an alternative, the flowchart of FIG. 9 can be viewed as depicting an example of elements of a method implemented within the network environment 600.

Beginning at block 903, the host monitor 609 can determine that an amount of memory bandwidth for a memory 109 in the tiered memory 106 exceeds a predefined level of consumption by more than a predefined amount of time. For example, the host monitor 609 could continually monitor the total bandwidth consumed by individual tiers of memory 109 in the tiered memory 106. If the total consumed bandwidth meets or exceeds a predefined threshold value, then the process proceeds to block 906.

At block 906, the host monitor 609 can identify the process 119 that is consuming the largest share of the memory bandwidth in the memory 109 of the tiered memory 106. The process(es) 119 can be identified using various approaches. For example, the host monitor 609 could select or identify the process 119 with the highest bandwidth consumption for a memory 109 in the tiered memory 106. The bandwidth consumed by a process 119 in a given memory 109 of tiered memory 106, could be computed or calculated by first determining the total bandwidth $B_j$ consumed for the memory 109 of the tiered memory 106. The host monitor 609 could then scale $B_j$ by a per-process factor $F_j^p$, resulting in the equation $$B_j^p := B_j \cdot F_j^p$$

where $B_j^p$ represents the per process 119 bandwidth consumption for a given tier of memory 109 in the tiered memory 106. Here, the index j refers to the j-th tier of memory, that is, j=1 means the first tier $T_1$, j=2 means the second tier $T_2$, etc.

$F_j^p$ represents the fraction of accesses incurred by process p on tier $T_j$. The simplest way to choose $F_j^p$ is to pick the fraction of tier $T_j$ that process p has allocated. A more accurate way to choose $F_j^p$ is to use hardware performance counters to periodically interrupt execution of the system when the processor accesses memory to examine which process is accessing each tier, to update statistics of the number of accesses per process per tier. Then, $F_j^p$ can be computed as the ratio of the count of accesses of p on tier $T_j$ over the total count of accesses to tier $T_j$.

As another example, the host monitor 609 could select or identify the process 119 with the highest ratio of bandwidth consumption relative to the number of allocated physical pages 113. For example, the host monitor 609 could use the ratio of $B_j^p/A_j^p$ rather than just $B_j^p$, where $A_j^p$ is the allocation of process p to tier $T_j$. This approach would preferentially select processes 119 that are consuming a large amount of memory bandwidth relative to the amount of memory allocated to the process 119.

Subsequently, at block 909, the host monitor 609 can notify the cluster management service 606 of the process 119 identified at block 906. This can result in the cluster management service 606 selecting another host computing device 100 with sufficient tiered memory 106 to host the process 119. Assuming that the cluster management service 606 is able to identify and select another host computing device 100, the cluster management service 606 could cause the process 119 to migrate from the current host computing device 100 to the new host computing device 100.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts and sequence diagrams show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts and sequence diagrams show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts and sequence diagrams can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g, storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A method, executed by a host computing device comprising:
   managing, with a hypervisor, a plurality of virtual machines (VMs) on the host computing device; and
   executing the plurality of virtual machines (VMs) using at least:
      a first amount of memory in a first memory tier of the host computing device, wherein:
         the first memory tier is one tier of a plurality of tiers of tiered memory of the host computing device;
         each of the VMs has an associated first active set function, the respective first active set function for each VM indicating a number of physical memory pages in the first memory tier accessed by that respective VM as a function of time while the plurality of VMs are executing;
         the first amount of memory in the first memory tier is sufficient to store all of the physical memory pages accessed by the VMs within a first maximum time interval while the plurality of VMs are executing;
         the maximum time interval is a largest first amount of time it takes for all of the physical memory pages in a respective active set function of each VM to fit in the first amount of memory in the first memory tier while the plurality of VMs are executing;

the first maximum time interval is based on a total of the plurality of first active set functions; and the first memory tier is a fastest tier of the tiered memory.

2. The method of claim 1, wherein
executing the plurality of virtual machines (VMs) using at least a first amount of memory in a first memory tier of the host computing device comprises:
executing the plurality of VMs using at least:
the first amount of memory in the first memory tier of the host computing device; and
a second amount of memory in a second memory tier of the host computing device;
each of the VMs has an associated second active set function, the second active set function for each respective VM indicating a number of physical memory pages accessed by that respective VM within the first memory tier and the second memory tier as a function of time while the plurality of VMs are executing;
the amount of memory in the second memory tier is sufficient to store all of the physical memory pages accessed by the VMs within a second maximum time interval while the plurality of VMs are executing;
the second maximum time interval is a largest second amount of time it takes for all of the physical memory pages in a respective second active set function of each VM to fit in either the first amount of memory in the first memory tier or the second amount of memory in the second memory tier while the plurality of VMs are executing; and
the second maximum time interval is based on a total of the plurality of second active set functions.

3. The method of claim 2, wherein a weight of each of the second plurality of second active set functions is based at least in part on a performance difference between the first memory tier and the second memory tier.

4. The method of claim 2, further comprising:
notifying a cluster manager that a first VM of the plurality of VMs is consuming a largest share of memory bandwidth of the second memory tier when the memory bandwidth exceeds a predefined level of consumption for more than a predefined amount of time.

5. The method of claim 4, wherein the cluster manager is configured to initiate a migration of the first VM to a new host computing device.

6. The method of claim 2, wherein the first memory tier comprises dynamic random access memory (DRAM) and the second memory tier comprises persistent memory.

7. The method of claim 1, wherein the amount of memory in the memory tier allocated to the first virtual machine is specified by an allocation policy.

8. A non-transitory computer readable medium having stored thereon instructions executable by one or more processors of a host computing device to execute operations comprising:
managing, with a hypervisor, a plurality of virtual machines (VMs) on the host computing device; and
executing the plurality of virtual machines (VMs) using at least:
a first amount of memory in a first memory tier of the host computing device, wherein:
the first memory tier is one tier of a plurality of tiers of tiered memory of the host computing device;
each of the VMs has an associated first active set function, the respective first active set function for each VM indicating a number of physical memory pages in the first memory tier accessed by that respective VM as a function of time while the plurality of VMs are executing;
the amount of memory in the first memory tier is sufficient to store all of the physical memory pages accessed by the VMs within a first maximum time interval while the plurality of VMs are executing;
the maximum time interval is a largest first amount of time it takes for all of the physical memory pages in a respective active set function of each VM to fit in the first amount of memory in the first memory tier while the plurality of VMs are executing;
the first maximum time interval is based on a total of the plurality of first active set functions; and
the first memory tier is a fastest tier of the tiered memory.

9. The computer readable medium of claim 8, wherein
executing the plurality of virtual machines (VMs) using at least a first amount of memory in a first memory tier of the host computing device comprises:
executing the plurality of VMs using at least:
the first amount of memory in the first memory tier of the host computing device; and
a second amount of memory in a second memory tier of the host computing device;
each of the VMs has an associated second active set function, the second active set function for each respective VM indicating a number of physical memory pages accessed by that respective VM within the first memory tier and the second memory tier as a function of time while the plurality of VMs are executing;
the amount of memory in the second memory tier is sufficient to store all of the physical memory pages accessed by the VMs within a second maximum time interval while the plurality of VMs are executing;
the second maximum time interval is a largest second amount of time it takes for all of the physical memory pages in a respective second active set function of each VM to fit in either the first amount of memory in the first memory tier or the second amount of memory in the second memory tier while the plurality of VMs are executing; and
the second maximum time interval is based on a total of the plurality of second active set functions.

10. The computer readable medium of claim 9, wherein a weight of each of the second plurality of second active set functions is based at least in part on a performance difference between the first memory tier and the second memory tier.

11. The computer readable medium of claim 9, the operations further comprising:
notifying a cluster manager that a first VM of the plurality of VMs is consuming a largest share of memory bandwidth of the second memory tier when the memory bandwidth exceeds a predefined level of consumption for more than a predefined amount of time.

12. The computer readable medium of claim 11, wherein the cluster manager is configured to initiate a migration of the first VM to a new host computing device.

13. The computer readable medium of claim 9, wherein the first memory tier comprises dynamic random access memory (DRAM) and the second memory tier comprises persistent memory.

14. The computer readable medium of claim 8, wherein the amount of memory in the memory tier allocated to the first virtual machine is specified by an allocation policy.

15. A system, comprising:
one or more processors of a host computing device; and
a non-transitory computer readable medium having stored thereon instructions executable by the one or more processors to perform operations comprising:
  managing, with a hypervisor, a plurality of virtual machines (VMs) on the host computing device; and
  executing the plurality of virtual machines (VMs) using at least:
  a first amount of memory in a first memory tier of the host computing device, wherein:
  the first memory tier is one tier of a plurality of tiers of tiered memory of the host computing device;
  each of the VMs has an associated first active set function, the respective first active set function for each VM indicating a number of physical memory pages in the first memory tier accessed by that respective VM as a function of time while the plurality of VMs are executing;
  the first amount of memory in the first memory tier is sufficient to store all of the physical memory pages accessed by the VMs within a first maximum time interval while the plurality of VMs are executing;
  the maximum time interval is a largest first amount of time it takes for all of the physical memory pages in a respective active set function of each VM to fit in the first amount of memory in the first memory tier while the plurality of VMs are executing;
  the first maximum time interval is based on a total of the plurality of first active set functions; and
  the first memory tier is a fastest tier of the tiered memory.

16. The system of claim 15, wherein
executing the plurality of virtual machines (VMs) using at least a first amount of memory in a first memory tier of the host computing device comprises:
  executing the plurality of VMs using at least:
    the first amount of memory in the first memory tier of the host computing device; and
    a second amount of memory in a second memory tier of the host computing device;
  each of the VMs has an associated second active set function, the second active set function for each respective VM indicating a number of physical memory pages accessed by that respective VM within the first memory tier and the second memory tier as a function of time while the plurality of VMs are executing;
  the amount of memory in the second memory tier is sufficient to store all of the physical memory pages accessed by the VMs within a second maximum time interval while the plurality of VMs are executing;
  the second maximum time interval is a largest second amount of time it takes for all of the physical memory pages in a respective second active set function of each VM to fit in either the first amount of memory in the first memory tier or the second amount of memory in the second memory tier while the plurality of VMs are executing; and
  the second maximum time interval is based on a total of the plurality of second active set functions.

17. The system of claim 16, wherein a weight of each of the second plurality of second active set functions is based at least in part on a performance difference between the first memory tier and the second memory tier.

18. The system of claim 16, the operations further comprising:
  notifying a cluster manager that the first VM of the plurality of VMs is consuming a largest share of memory bandwidth of the second memory tier when the memory bandwidth exceeds a predefined level of consumption for more than a predefined amount of time.

19. The system of claim 18, wherein the cluster manager is configured to initiate a migration of the first VM to a new host computing device.

20. The system of claim 15, wherein the amount of memory in the memory tier allocated to the first virtual machine is specified by an allocation policy.

* * * * *